(12) United States Patent
Holtcamp

(10) Patent No.: US 6,211,312 B1
(45) Date of Patent: Apr. 3, 2001

(54) OLEFIN POLYMERIZATION PROCESS USING ACTIVATED LEWIS ACID-BASE COMPLEXES

(75) Inventor: Matthew W. Holtcamp, Huffman, TX (US)

(73) Assignee: Univation Technologies, Houston, TX (US)

( * ) Notice: Subject to any disclaimer, the term of this patent is extended or adjusted under 35 U.S.C. 154(b) by 0 days.

(21) Appl. No.: 09/325,682

(22) Filed: Jun. 3, 1999

Related U.S. Application Data

(60) Provisional application No. 60/089,023, filed on Jun. 12, 1998.

(51) Int. Cl.$^7$ ............................. C08F 4/44; C08F 4/16

(52) U.S. Cl. ...................... 526/133; 526/134; 526/160; 526/161; 526/943; 502/153

(58) Field of Search .................... 526/160, 161, 526/943, 901, 133, 134

(56) References Cited

U.S. PATENT DOCUMENTS

| | | | |
|---|---|---|---|
| 5,198,401 | 3/1993 | Turner et al. | 502/155 |
| 5,288,677 | 2/1994 | Chung et al. | 502/152 |
| 5,296,433 | 3/1994 | Siedle et al. | 502/117 |
| 5,369,196 | 11/1994 | Matsumoto et al. | 526/127 |
| 5,427,991 | 6/1995 | Turner | 502/103 |
| 5,643,847 * | 7/1997 | Walzer, Jr. | 502/117 |
| 5,663,249 | 9/1997 | Ewen et al. | 526/134 |
| 5,721,183 | 2/1998 | Neithamer | 502/103 |
| 5,721,185 | 2/1998 | LaPointe et al. | 502/117 |
| 5,756,609 | 5/1998 | Cohen | 526/127 |
| 5,763,547 | 6/1998 | Kolthammer et al. | 526/129 |
| 5,807,509 | 9/1998 | Elder et al. | 526/160 |
| 5,834,393 | 11/1998 | Jacobsen et al. | 502/152 |
| 5,840,947 * | 11/1998 | Kuber et al. | 556/8 |

FOREIGN PATENT DOCUMENTS

| | | |
|---|---|---|
| 0277004 A1 | 8/1988 | (EP) . |
| 0 427 696 A2 | 5/1991 | (EP) . |
| 0 520 732 A1 | 12/1992 | (EP) . |
| 0 671 416 A1 | 9/1995 | (EP) . |
| 0694548 A1 | 1/1996 | (EP) . |
| 0771822 A1 | 5/1997 | (EP) . |
| 0 612 768 B1 | 11/1997 | (EP) . |
| 0 612 769 B1 | 11/1997 | (EP) . |
| 0 500 944 B1 | 10/1998 | (EP) . |
| 0 573 403 B1 | 11/1998 | (EP) . |
| 0 582 268 B1 | 11/1998 | (EP) . |
| 4-142306 | 5/1992 | (JP) . |
| WO 91/14713 | 10/1991 | (WO) . |
| WO 92/01723 | 2/1992 | (WO) . |
| WO 93/14132 | 7/1993 | (WO) . |
| WO 93/19104 | 9/1993 | (WO) . |
| WO 95/15815 | 6/1995 | (WO) . |
| WO 96/04319 | 2/1996 | (WO) . |

(List continued on next page.)

OTHER PUBLICATIONS

*Study Surf. Sci. Catal.* (Catalyst Design for Tailor–Made Polyolefins), Ewen, vol. 89, pp. 405–410, (1994).

(List continued on next page.)

*Primary Examiner*—David W. Wu
*Assistant Examiner*—R. Harlan
(74) *Attorney, Agent, or Firm*—James Sher; Lisa Kimes Jones

(57) ABSTRACT

This description addresses a process for the preparation of polyolefins from one or more olefinic monomers comprising combining said olefins under olefin polymerization conditions with i) a transition metal organometallic catalyst compound, ii) a Lewis acid-base complex where the Lewis acid group is an aluminum or boron compound having at least one halogenated aryl ligand and the Lewis base group is an amine or ether compound, said combining being conducted in the presence of a tri-n-alkyl aluminum or gallium compound.

7 Claims, 2 Drawing Sheets

FOREIGN PATENT DOCUMENTS

| | | |
|---|---|---|
| WO 96/08519 | 3/1996 | (WO) . |
| WO 96/23004 | 8/1996 | (WO) . |
| WO 96/23005 | 8/1996 | (WO) . |
| WO 96/26967 | 9/1996 | (WO) . |
| WO 96/34021 | 10/1996 | (WO) . |
| WO 97/07141 | 2/1997 | (WO) . |
| WO 98/03558 | 1/1998 | (WO) . |
| WO 98/07515 | 2/1998 | (WO) . |

OTHER PUBLICATIONS

*Jour. Poly.Sci., PTA: Poly. Chem.*, Chien et al., vol. 29, pp. 1603–1607, (1991).

*J. Am. Chem. Soc.*, Marks et al., vol. 113, pp. 3623–3625, (1991).

*J. Am. Chem. Soc.*, Baird et al., vol. 116, pp. 6435–6436, (1994).

*J. Am. Chem. Soc.*, Hair et al., vol. 121, pp. 4922–4923, (1999).

*Organometallics*, Bochmann et al., vol. 17, pp. 5908–5912, (1998).

*J. of Molecular Catalysis A: Chemical*, Lee et al., vol. 132, pp. 231–239, (1998).

*Inorg. Chem.*, Belgardt et al., 1995, vol. 34, pp. 3821–3522.

*Organometallics*, Duchateau et al., 1997, vol. 16, pp. 4995–5005.

*Journal of Organometallic Chemistry*, Song et al., 545–546 (1997), pp. 597–600.

*Journal of Organometallic Chemistry*, Röttger et al., 518 (1996), pp. 17–19.

*J. Chem. Soc., Chem. Commun.*, Bochmann et al., 1995, pp. 2081–2082.

\* cited by examiner

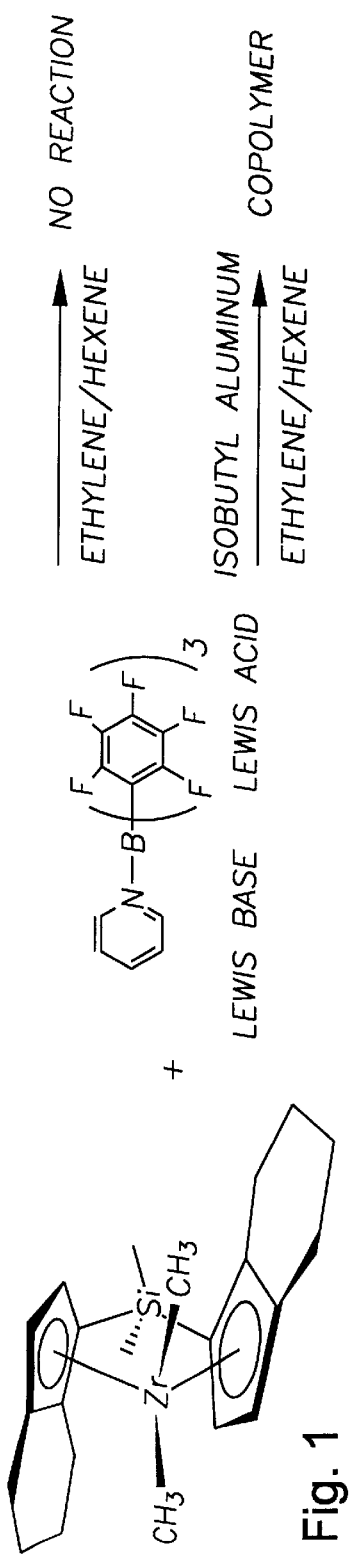
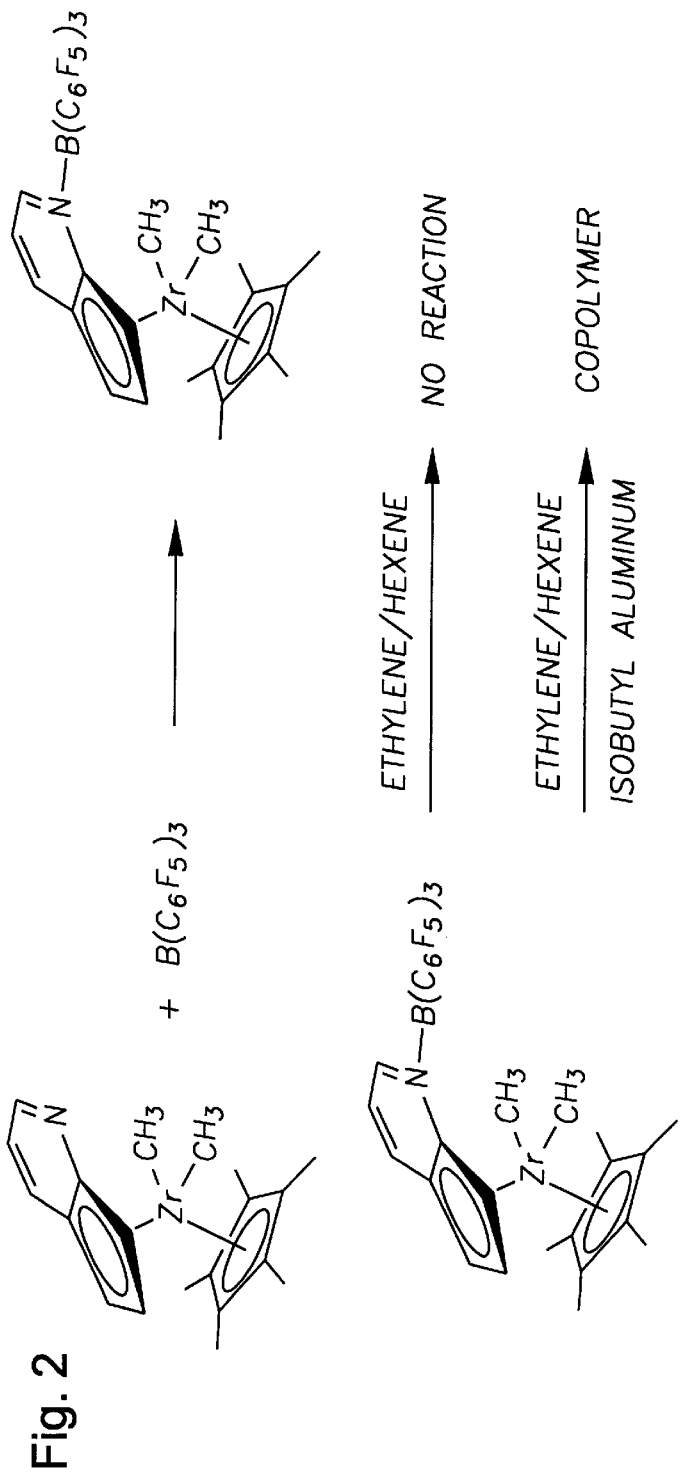
Fig. 1
Fig. 2

OLEFIN POLYMERIZATION PROCESS USING ACTIVATED LEWIS ACID-BASE COMPLEXES

CROSS-REFERENCE TO RELATED APPLICATION

This patent application claims priority from provisional U.S. application Ser. No. 60/089,023, filed Jun. 12, 1998, which is herein fully incorporated by reference.

TECHNICAL FIELD

This invention relates to the preparation of olefin polymers using ionic catalyst systems based on transition metal compounds activated by a combination of halogenated aryl-containing Group 13 metal or metalloid based Lewis acids and organo-Group 13 metal compounds.

BACKGROUND OF THE INVENTION

Boron based Lewis acids having fluorinated aryl substituents are known to be capable of activating transition metal compounds into olefin polymerization catalysts. Trisperfluorophenylborane is taught in EP 0 520 732 to be capable of abstracting a ligand for certain cyclopentadienyl derivatives of transition metals while providing a stabilizing, compatible noncoordinating anion. The term "noncoordinating anion" is now accepted terminology in the field of olefin polymerization, both by coordination or insertion polymerization and carbocationic polymerization. See, for example, EP 0 277 004, U.S. Pat. No. 5,198,401, and Baird, Michael C., et al, *J Am. Chem. Soc.* 1994, 116, 6435–6436, and U.S. Pat. No. 5,668,234. The noncoordinating anions are described to function as electronic stabilizing cocatalysts, or counterions, for cationic metallocene complexes which are active for olefin polymerization. The term noncoordinating anion as used here applies both to truly noncoordinating anions and coordinating anions that are at most weakly coordinated to the cationic complex so as to be labile to replacement by olefinically or acetylenically unsaturated monomers at the insertion site.

Organoaluminum compounds are known to be useful with metallocene based transition metal cationic catalysts stabilized with noncoordinating anions, both for catalyst poison inhibition and for alkylation of metallocene dihalide compounds, see WO 91/14713 and EP 0 500 944. See also WO93/14132 where alumoxane compounds are said to be useful for inhibiting catalyst poisons in the presence of cationic, cyclopentadienyl Group 4 complexes activated by tris(perfluorophenyl)boron.

U.S. Pat. No. 5,296,433 teaches the utility in olefin polymerization of borane complexes comprising tris(pentafluorophenyl)borane and complexing compounds such as water, alcohols, mercaptans, silanols, and oximes. These complexes are said to render Group IVB organometallic catalysts based on them soluble in olefin monomer such that higher molecular weight polymers can be made with resulting lower levels of catalyst residue. WO 96/26967 addresses similar tris(pentafluorophenyl)borane complexes and their use with Group IVB organometallic compounds to make rubbery polypropylene homopolymers and copolymers. Polymerization examples are presented where trialkyl aluminum compounds were combined with the reaction product of metallocene compounds with the described complexes. This document also teaches that tris(pentafluorophenyl)-borane forms 1:1 complexes with Lewis bases such as ether, amines and phosphines but states that no uses for such donor-acceptor complexes have been taught.

BRIEF DESCRIPTION OF THE FIGURES

The attached figures illustrate specific embodiments of the invention.

FIG. 1 illustrates the effectiveness of adding a tri-alkyl aluminium compound ((i-Bu)$_3$Al)) to a mix of the Lewis acid-base complex (NC$_5$H$_5$)B(C$_6$F$_5$)$_3$) to a biscyclopentadienyl zirconcene (Me$_2$Si(H$_4$-indenyl)$_2$Zr(CH$_3$)$_2$).

FIG. 2 illustrates the preparation of a Lewis acid-base complex where the Lewis acid is (B(C$_6$F$_5$)$_3$) and the conjugate base is a structural member of the cyclopentadienyl ligand of a biscyclopentadienyl zirconocene ([(C$_6$F$_5$)$_3$B—NC$_8$H$_6$]Cp*Zr(CH$_3$)$_2$) and subsequent activation with the addition of a tri-alkyl aluminium compound (tri(isobutyl) aluminum)).

SUMMARY OF THE INVENTION

This invention addresses a process for the preparation of polyolefins from one or more olefinic monomers comprising combining said olefins with i) a transition metal organometallic catalyst compound and ii) a Lewis acid-base complex where the Lewis acid group is a Group 13 compound having at least one halogenated aryl ligand, said combining being conducted in the presence of an alkylated Group 13 element Lewis acid, such as a tri-n-alkyl aluminum compound.

DESCRIPTION OF THE INVENTION

The invention provides a process for olefin polymerization in which a noncoordinating anion precursor activator and the organometallic catalyst precursor compounds can be combined without ionizing reactions until the addition of a Lewis acid initiator. This allows for controlled polymerization reaction startup, or initiation, and permits greater control of the overall polymerization process. In particular, it has been recognized that the aging of ionic catalyst complexes can decrease activities and reduce polymer molecular weights. Also, the coordination polymerization activity of typical cationic catalyst systems can be so great that excessive exotherms are created and difficulties with maintaining the integrity of inert supports, with attendant problems of fouling on reactor vessel walls and in effluent stream means. By staging the introduction of the initiator Lewis acid compounds according to the invention, either of premature aging or runaway startups can be inhibited or even eliminated.

Figure 3:
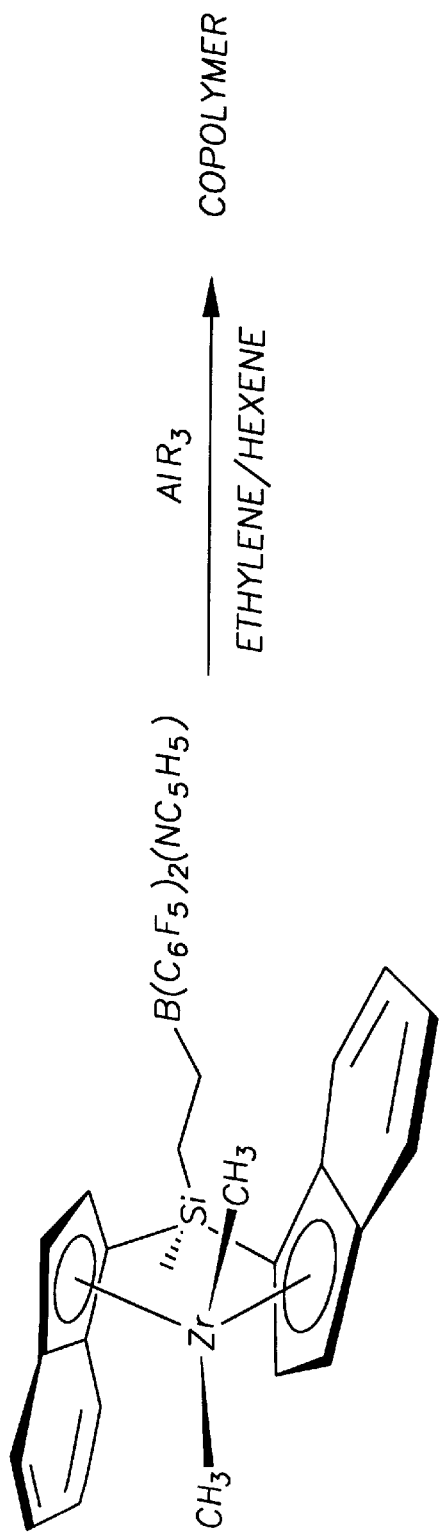
FIG. 3 illustrates a Lewis acid-base complex where the Lewis acid is a structural member of the bridging group of a racemic biscyclopentadienyl zirconocene (rac-CH$_3$((C$_5$H$_5$N)(C$_6$F$_5$)$_2$BCH$_2$CH$_2$)Si(Ind)$_2$Zr(CH$_3$)$_2$) and the conjugate base is pyridine, and initation for olefin polymerization with a tri-alkyl aluminium compound.
Figure 4:
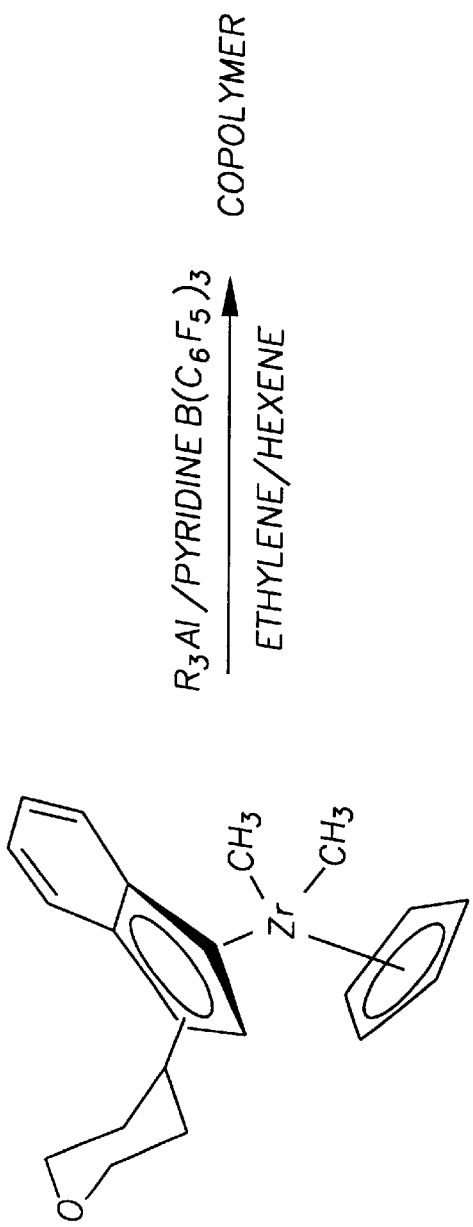
FIG. 4 illustrates olefin copolymerization when a tri-alkyl aluminium compound and a Lewis acid-base complex ((NC$_5$H$_5$)B(C$_6$F$_5$)$_3$)) are added to a Lewis base-containing biscyclopentadienyl zirconcene ((THFInd)CpZrMe$_2$).

As illustrated in FIGS. 1–4, Lewis acid activators with halogenated aryl substituents will complex with Lewis bases. When the Lewis base contains sufficient basicity and steric requirements, a Lewis base adduct can be formed which can inhibit reaction of the Lewis acid activator with transition metal alkyls under ambient conditions. Such Lewis base compounds should be capable of binding to the activator Lewis acid such that at room temperature reactions between the Lewis acid and the transition metal alkyls are inhibited. Typically a suitable Lewis base will have a Lewis basicity greater than or equal to diethylether. Thus a Lewis acid-Lewis base complex is obtained which is unreactive with catalytically suitable transition metal alkyls under ambient conditions. Activation with the Lewis acid-base complex is realized by the addition of the initiator Group 13 metal alkyls. (See FIGS. 1–3). Presumably the Group 13 alkyls both scavenge the Lewis base and further react with Lewis acid to form reaction product Group 13 metal activators having halogenated aryl substituents transferred from the initial Lewis acid. Importantly, the alkyl group containing Group 13 metal complexes also inhibit the Lewis bases from deactivating olefin polymerization catalysts by complexation. Additionally, the Lewis base may be an independent compound or may comprise part of the ligand framework of the olefin polymerization catalyst. In the latter, complexation by a Lewis acid will modify the catalyst thus likely affecting the properties of polymer as well as serving to provide activation upon addition of the Group 13 metal alkyl activators (See FIGS. 2–4).

Group 13 Lewis acid compounds of the invention include those olefin catalyst activator Lewis acids based typically on boron or aluminum and having at least one bulky, electron-withdrawing ligand such as the halogenated aryl ligands of tris(perfluorophenyl)borane. These bulky ligands should be those sufficient to allow the Lewis acids to function as electronically stabilizing, compatible noncoordinating anions. Stable ionic complexes are achieved when the anions will not be a suitable ligand donor to the strongly Lewis acidic cationic organometallic transition metal cations used in insertion polymerization, i.e., inhibit ligand transfer that would neutralize the cations and render them inactive for polymerization. The Lewis acids fitting this description can be described by the following formula:

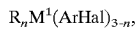

$$R_n M^1 (ArHal)_{3-n},$$

where R is a monoanionic ligand, $M^1$ is a Group 13 metal and ArHal is a halogenated $C_6$ aromatic or higher carbon number polycyclic aromatic hydrocarbon or aromatic ring assembly in which two or more rings (or fused ring systems) are joined directly to one another or together, and n=0–2. Suitable R ligands include substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphosphido or other anionic substituent. Examples of ArHal include the phenyl, napthyl and anthracenyl radicals of U.S. Pat. No. 5,198,401 and the biphenyl radicals of WO 97/29845. The use of the terms halogenated or halogenation means for the purposes of this application that at least one third of hydrogen atoms on carbon atoms of the aryl-substituted aromatic ligands be replaced by halogen atoms, and more preferred that the aromatic ligands be perhalogenated. Fluorine is the most preferred halogen. The ligand descriptions of each the foregoing documents are incorporated by reference for information and U.S. patent practice purposes.

The Lewis base group used to complex the halogenated aryl-substituted Lewis acid is a neutral compound having an electron donating moiety in a chemically accessible position so that it can complex with the Lewis acid and satisfies the above-mentioned criteria as to Lewis acid strength. Generic examples include amine and ether compounds. Specific examples include pyridine, fluoropyridine, tetrahydrofuran, and diethylether. Fluoropyridine is particularly suitable with strong Lewis acids such as trisperfluorophenyl aluminum.

The initiator Group 13 metal alkyls useful in accordance with the invention include those defined by the formula:

$$(R')_3 M^2,$$

where R' is a linear, branched or cyclic hydrocarbyl group containing from 1 to 25 carbon atoms, and $M^2$ is a Group 13, row 2 or higher metal atom. Examples include the trisalkylaluminum compounds known to be useful as scavenging compounds, examples include triethyl aluminum, triisobutyl aluminum, tri-n-octyl aluminum, tribenzyl aluminum, trineopentyl aluminum, and tricyclohexyl aluminum; and include the equivalent gallium alkyls, $GaR'_3$. Equivalents such as akyl substituted organometalloid aluminum compounds are additionally suitable.

The Lewis acid-base complex can be prepared using about 1:1 ratio of Lewis base compound to Lewis acid activator compound; excess Lewis base should be avoided. The Group 13 metal alkyl initiator compounds can be used generally at greater than or equal to 2 mol. equivalents of the Lewis acid-base complex.

Transition metal compounds suitable as olefin polymerization catalysts by coordination or insertion polymerization in accordance with the invention will include the known transition metal compounds useful in traditional Ziegler-Natta coordination polymerization and as well the metallocene compounds similarly known to be useful in coordination polymerization, when such compounds are capable of catalytic activation by the cocatalyst activators described for the invention. These will typically include Group 4-10 transition metal compounds wherein at least one metal ligand can be abstracted by the cocatalyst activators, particularly those ligands including hydride, alkyl and silyl. Ligands capable of abstraction and transition metal compounds comprising them include those metallocenes described in the background art, see for example U.S. Pat. No. 5,198,401 and WO 92/00333. Syntheses of these compounds is well known from the published literature. Additionally, where the metal ligands include halogen, amido or alkoxy moieties (for example, biscyclopentadienyl zirconium dichloride) which are not capable of abstraction with the activating cocatalysts of the invention, they can be converted into suitable ligands via known alkylation reactions with organometallic compounds such as lithium or aluminum hydrides or alkyls, alkylalumoxanes, Grignard reagents, etc. See also EP-A1-0 570 982 for the reaction of organoaluminum compounds with dihalo-substituted metallocene compounds prior to addition of activating anion compounds. All documents are incorporated by reference for purposes of U.S. patent practice.

Additional description of metallocene compounds which comprise, or can be alkylated to comprise, at least one ligand capable of abstraction to form a catalytically active transition metal cation appear in the patent literature, e.g., EP-A-0 129 368, U.S. Pat. No. 4,871,705, 4,937,299, 5,324,800 EP-A-0 418 044, EP-A-0 591 756, WO-A-92/00333 and WO-A-94/01471. Such metallocene compounds can be described for this invention as mono- or biscyclopentadienyl substituted Group 4, 5, or 6 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought. Preferably the cyclopentadienyl rings (including substituted cyclopentadienyl-based fused ring systems, such as indenyl, fluorenyl, azulenyl, or substituted analogs of them), when bridged to each other, will be lower alkyl-substituted ($C_1$–$C_6$) in the 2 position (without or without a similar 4-position substituent in the fused ring systems) and may additionally comprise alkyl, cycloalkyl, aryl, alkylaryl and or arylalkyl subtituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be heteroatom containing with 1–5 non-hydrogen/carbon atoms, e.g., N, S, O, P, Ge, B and Si. All documents are incorporated by reference for purposes of U.S. patent practice.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,001,205, 5,198,401, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, for example, U.S. Pat. No. 4,892,851, U.S. Pat. No. 5,017,714, U.S. Pat. No. 5,296,434, U.S. Pat. No. 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein. Though many above are directed to catalyst systems with alumoxane activators, the analogous metallocene compounds will be useful with the cocatalyst activators of this invention for active coordination catalyst systems, when the halogen, amide or alkoxy containing ligands of the metals (where occurring) are replaced with ligands capable of abstraction, for example, via an alkylation reaction as described above, and another is a group into which the ethylene group —C=C— may insert, for example, hydride, alkyl, or silyl. All documents are incorporated by reference for purposes of U.S. patent practice.

Representative metallocene compounds can have the formula:

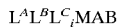

$L^A L^B L^C_i MAB$ where, $L^A$ is a substituted cyclopentadienyl or heterocyclopentadienyl ancillary ligand π-bonded to M; $L^B$ is a member of the class of ancillary ligands defined for $L^A$, or is J, a heteroatom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 transition metal; and, A and B are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethyl-cyclopentadienyl-tert-butylamido titanium dichloride, pentamethylcyclopentadienyl titanium trimethyl, dimethylsilylyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl; bridged bis-cyclopentadienyl compounds such as dimethylsilylbis (tetrahydroindenyl) zirconium dichloride; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Representative traditional Ziegler-Natta transition metal compounds include tetrabenzyl zirconium, tetra bis (trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction and that ligand into which the ethylene (olefinic) group can be inserted. These features enable the ligand abstraction from the transition metal compound and the concomitant formation of the ionic catalyst composition of the invention.

Additional organometallic transition metal compounds suitable as olefin polymerization catalysts in accordance with the invention will be any of those Group 4-10 that can be converted by ligand abstraction into a catalytically active cation and stabilized in that active electronic state by a noncoordinating or weakly coordinating anion sufficiently labile to be displaced by an olefinically unsaturated monomer such as ethylene. Exemplary compounds include those described in the patent literature. U.S. Pat. No. 5,318,935 describes bridged and unbridged bisamido transition metal catalyst compounds of Group 4 metals capable of insertion polymerization of cc-olefins. International patent publications WO 96/23010, WO 97/48735 and Gibson, et. al., Chem. Comm., pp. 849–850 (1998), disclose diimine-based ligands for Group 8-10 metal compounds shown to be suitable for ionic activation and olefin polymerization. See also WO 97/48735. Transition metal polymerization catalyst systems from Group 5-10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Bridged bis(arylamido) Group 4 compounds for olefin polymerization are described by D. H. McConville, et al, in Organometallics 1995, 14, 5478–5480. Synthesis methods and compound characterization are presented. Further work appearing in D. H. McConville, et al, Macromolecules 1996, 29, 5241–5243, described the bridged bis(arylamido) Group 4 compounds are active catalysts for polymerization of 1-hexene. Additional transition metal compounds suitable in accordance with the invention include those described in WO 96/40805. Each of these documents is incorporated by reference for the purposes of U.S. patent practice.

When using the catalysts of the invention, particularly when immobilized on a support, the total catalyst system will generally additionally comprise one or more scavenging compounds. The term "scavenging compounds" as used in this application and its claims is meant to include those compounds effective for removing polar impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself.

Typically the scavenging compound will be an excess of the alkylated Lewis acids needed for initiation, as described above, or will be additional known organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminumoxane, and tri-n-octyl aluminum. Those scavenging compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as an activator, any excess over the amount needed to activate the catalysts present will act as scavenger compounds and additional scavenging compounds may not be necessary. Alumoxanes also may be used in scavenging amounts with other means of activation, e.g., methylalumoxane and triisobutyl-aluminoxane. The amount of scavenging agent to be used with Group 4-10 catalyst compounds of the invention is minimized during polymerization reactions to that amount effective to enhance activity and avoided altogether if the feeds and polymerization medium can be sufficiently free of adventitious impurities.

The catalyst complexes of the invention are useful in polymerization of unsaturated monomers conventionally known to be polymerizable under coordination polymerization conditions using metallocenes. Such conditions are well known and include solution polymerization, slurry polymerization, gas-phase polymerization, and high pressure polymerization. The catalyst of the invention may be supported and as such will be particularly useful in the known operating modes employing fixed-bed, moving-bed, fluid-bed, slurry or solution processes conducted in single, series or parallel reactors. Pre-polymerization of supported catalyst of the invention may also be used for further control of polymer particle morphology in typical slurry or gas phase reaction processes in accordance with conventional teachings.

In alternative embodiments of olefin polymerization methods for this invention, the catalyst system is employed in liquid phase (solution, slurry, suspension, bulk phase or combinations thereof), in high pressure liquid or supercritical fluid phase, or in gas phase. Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352,749, 5,436,304, 5,453,471, and 5,463,999, and WO 95/07942. Each is incorporated by reference for purposes of U.S. patent practice.

Generally speaking the polymerization reaction temperature can vary from about 40° C. to about 250° C. Preferably the polymerization reaction temperature will be from 60° C. to 2200, more preferably below 200° C. The pressure can vary from about 1 mm Hg to 2500 bar, preferably from 0.1 bar to 1600 bar, most preferably from 1.0 to 500 bar. Where lower molecular weight copolymers, e.g., Mn<10,000, are sought it will be suitable to conduct the reaction processes at temperatures above about 0° C. and pressures under 500 bar.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically <50 bar), at a typical temperature of 40–250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000–3000 kPa and 60–160° C., using hydrogen as a reaction modifier (100–200 PPM), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and 5,405,922 and 5,462,999, which are incorporated by reference for purposes of U.S. patent practice.

Ethylene-α-olefin (including ethylene-cyclic olefin and ethylene-α-olefin-diolefin) elastomers of high molecular weight and low crystallinity can be prepared utilizing the catalysts of the invention under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between 40 and 160° C. The process can be carried out in a stirred tank reactor, or more than one operated in series or parallel. See the general disclosure of U.S. Pat. No. 5,001,205 for general process conditions. See also, co-pending U.S. patent applications Ser. No. 08/426,363, filed Apr. 21, 1995 and Ser. No. 08/545,973 filed Oct. 20, 1995. All documents are incorporated by reference for description of polymerization processes, ionic activators and useful scavenging compounds.

Other olefinically unsaturated monomers besides those specifically described above may be polymerized using the catalysts according to the invention, for example, styrene, alkyl-substituted styrene, ethylidene norbornene, norbornadiene, dicyclopentadiene, and other olefinically-unsaturated monomers, including other cyclic olefins, such as cyclopentene, norbornene, and alkyl-substituted norbornenes. Additionally, alpha-olefinic macromonomers of up to 100 mer units, or more, may also be incorporated by copolymerization.

The catalyst compositions of the invention can be used as described above individually for coordination polymerization or can be mixed to prepare polymer blends with other known olefin polymerization catalyst compounds. By selection of monomers, blends of coordination catalyst compounds, polymer blends can be prepared under polymerization conditions analogous to those using individual catalyst compositions. Polymers having increased MWD for improved processing and other traditional benefits available from polymers made with mixed catalyst systems can thus be achieved.

The formation of blended polymers can be achieved ex situ through mechanical blending or in situ through the use of a mixed catalyst system. It is generally believed that in situ blending provides a more homogeneous product and allows the blend to be produced in one step. The use of mixed catalyst systems for in situ blending involves combining more than one catalyst in the same reactor to simultaneously produce multiple distinct polymer products. This method requires additional catalyst synthesis and the various catalyst components must be matched for their activities, the polymer products they generate at specific conditions, and their response to changes in polymerization conditions.

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as: Me=methyl, THF, or thf, =tetrahydrofuran, and Cp*, permethylated cyclopentadienyl metal ligand.

All molecular weights are weight average molecular weight unless otherwise noted. Molecular weights (weight average molecular weight ($M_w$) and number average molecular weight ($M_n$) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III", J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for $M_w/M_n$ which was calculated from elution times. The numerical analyses were performed using Expert Ease' software available from Waters Corporation.

EXAMPLES

For the following examples trispentafluorophenylborane was purchased from Boulder Chem. Co. and used as received. Trispentafluorophenylaluminum was synthesized as reported by Biagini, P. et al. (EP 0 694 548). Pyridine was dried prior to use with $CaH_2$. Anhydrous tetrahydrofuran and diethyl ether was purchased from Aldrich and used as received. o-perfluorobiphenylborane was prepared by the method used by Marks. et al. (WO 97/29845). $HB(C_6F_5)_2$ was prepared using the method described by Piers et al. (Angew. Chem. Int. Ed. Engl. 1995, 34, 809). $(NC_8H_6)Cp*Zr(CH_3)_2$ was obtained from laboratory stock prepared in accordance with the method descried in copending U.S. application Ser. No. 08/999,214, filed Dec. 29, 1997. $Zr(NMe_2)_4$ was prepared by the method described by Jordan et al. (Organometallics 1995, 14, 5.) The abbreviation $BAr_{f15}$ is used for $B(C_6F_5)_3$, tris(perfluorophenyl) borane, other derivations thereof are described below. Syntheses:

1. $(NC_5H_5)B(C_6F_5)_3$, "$PYrBAr_{f15}$"

$(NC_5H_5)B(C_6F_5)_3$ was prepared similarly to the method of A. G. Massey, et al, J. Organomet. Chem., 2(1964), 245–250, by dissolving $B(C_6F_5)_3$ in pyridine and removing solvent under vacuum. The resulting white powder was washed with pentane and dried. Yields were quantitative. $^{19}F$ NMR ($C_6D_6$; ref. to $CF_3C_6H_5$ δ=−62.5) δ=−131.1, −155.2, −162.4. Note: At room temperature in the presence of triisobutylaluminum no reaction was observed by $^{19}F$ NMR.

2. $(C_4H_8O)B(C_6F_5)_3$, "$THFBAr_{f15}$"

$(C_4H_8O)B(C_6FS)_3$ was prepared by dissolving $B(C_6F_5)_3$ in THF and removing solvent under vacuum. The resulting white powder was washed with pentane and dried. Yields were quantitative.

3. $(Et_2O)B(C_6F_5)_3$, "$Et_2OBAr_{f15}$"

$(Et_2O)B(C_6F_5)_3$ was prepared by dissolving $B(C_6F_5)_3$ in diethyl ether and removing solvent under vacuum. The resulting white powder was washed with pentane and dried. Yields were quantitative.

4. $(FC_5H_4N)Al(C_6F_5)_3$, "$3fpyrAlAr_{f15}$"

$(FC_5H_4N)Al(C_6F_5)_3$ was prepared by dissolving $Al(C_6F_5)_3$ in toluene and adding a 10-fold excess of 3-fluoropyridine to the solution. The solvent was concentrated, pentane was added and the resulting white precipitate was filtered and dried in vacuo.

5. $(NC_5H_5)Al(C_6F_5)_3$, "$pyrAlAr_{f15}$", $(NC_5H_5)Al(C_6F_5)_3$ was prepared by dissolving $Al(C_6F_5)_3$ in toluene and adding a 10-fold excess of pyridine to the solution. The solvent was concentrated, pentane was added and the resulting white precipitate was filtered and dried in vacuo.

6. $(NC_5H_3F_2)Al(C_6F_5)_3$ (Comparative)

$(NC_5H_3F_2)Al(C_6F_5)_3$ was prepared by dissolving $Al(C_6F_5)_3$ in toluene and adding a 10-fold excess of 2,6-difluoropyridine to the solution. The solvent was concentrated, pentane was added and the resulting white precipitate was filtered and dried in vacuo. The basicity of this compound was too weak to inhibit reaction of the activator with a catalytically suitable metallocene.

7. $(NC_5F_5)Al(C_6F_5)_3$ "$f_5pyrAlAr_{f15}$"(Comparative)

$(NC_5Fs)Al(C_6F_5)_3$ was prepared by dissolving $Al(C_6F_5)_3$ in toluene and adding a 10-fold excess of pentafluoropyridine to the solution. The solvent was concentrated, pentane was added and the resulting white precipitate was filtered and dried in vacuo. This compound also was too weak to inhibit reaction of the activator with a catalytically suitable metallocene.

8. $(NC_5H_5)B(C_{12}F_8)_3$ (o-perfluorobiphenylborane).

$(NC_5H_5)B(C_{12}F_8)_3$ was prepared by dissolving $B(C_{12}F_8)_3$ in pyridine and removing solvent under vacuum.

The resulting white powder was washed with pentane and dried. Yields were quantitative. This compound was inoperative when used with triiso-butylaluminum at 60° C. polymerization temperature. It is likely steric hindrance presented by these aryl substituents prevented ligand transfer to the Group 13 activator, higher polymerization temperature would likely overcome this hindrance.

9. $(NC_5H_5)B(C_{12}F_8)_3$ (p-perfluorobiphenylborane).

$(NC_5H_5)B(C_{12}F_8)_3$ is prepared by dissolving $B(C_{12}F_8)_3$ in pyridine and removing solvent under vacuum. The resulting white powder is washed with pentane and dried. Yields should similarly be quantitative. This compound has lesser steric hindrance and would likely be operative in accordance with the invention at lower temperatures that those required for 8 above.

10. $CH_3(CH_2=CH)Si(Cp*H)_2$.

Lithium tetramethylcyclopentadienyl (20 grams) was combined with dichloromethylvinylsilane (11 grams) in 300 mls of THF. The resulting slurry was stirred three hours. The solvent was removed under vacuum. An orange oil was extracted with pentane. Distillation under a dynamic vacuum with heating removed $CH_3(CH_2=CH)Si(Cp*H)Cl$. The residual oil was used without further purification.

11. $CH_3(CH_2=CH)Si(Cp*)_2Zr(NMe_2)_2$.

$CH_3(CH_2=CH)Si(Cp*H)_2$ (8.4 grams) was combined with $Zr(NMe_2)_4$ (7.2 grams) in toluene (200 mls). The solution was stirred at 90° C. overnight. The resulting solution was concentrated and pentane was added resulting in the isolation of an orange precipitate. (5 grams) $^1H$ NMR $(C_6D_6)$; δ 0.85 (s), 1.92 (s), 1.97 (s), 2.10 (s), 2.20 (s), 2.95 (s), 2.96 (s), 5.9–6.2 (m), 6.85–7.0 (m).

12. $CH_3(CH_2=CH)Si(Cp*)_2ZrC_2$.

$CH_3(CH_2=CH)Si(Cp*)_2Zr(NMe_2)_2$. (5 grams) was combined with TMSCl (>10 equivalents) in toluene (200 mls). The solution was stirred overnight. The resulting solution was concentrated and pentane was added resulting in the isolation of a yellow precipitate. (3.8 grams) $^1H$ NMR $(C_6D_6)$; δ 0.72 (s), 1.79 (s), 1.80 (s), 2.05 (s), 2.07 (s), 5.8–6.1 (m), 6.5–6.7 (m).

13. $CH_3((C_6F_5)_2BCH_2CH_2)Si(CP*)_2ZrCl_2$.

$CH_3(CH_2=CH)Si(Cp*)_2ZrCl_2$ (1.4 grams) was combined with $[HB(C_6F_5)_2]_2$ (1.0 grams) in dichloromethane (30 mls) at −30° C. The solution was warmed to room temperature. The resulting solution was concentrated and pentane was added resulting in the isolation of a yellow precipitate in quantitative yields. $^1H$ NMR $(C_6D_6)$; δ 0.8 (s), 1.4 (m), 1.79 (s), 1.87 (s), 2.04 (s), 2.09 (s), 2.1 (m).

14. $CH_3((C_5H_5N)(C_6F_5)_2BCH_2CH_2)Si(Cp*)_2ZrCl_2$.

$CH_3((C_6F_5)_2BCH_2CH_2)Si(CP*)_2ZrCl_2$ (0.3 grams) was dissolved in a one to one mixture of toluene and pyridine (10 mls). The solvent was removed under vacuum and the resulting solid was dissolved in dichloromethane. Pentane was added to precipitate the product which was filtered and dried under vacuum. 1H NMR $(C_6D_6)$; δ 0.8 (s), 1.4 (m), 1.79 (s), 1.87 (s), 2.04 (s), 2.09 (s), 2.1 (m).

15. $CH_3(CH_2=CH)Si(IndH)_2$.

$CH_3(CH_2=CH)Si(IndH)_2$ was prepared using the procedure Jordan et al. (Organometallics 1996, 15, 4038) reported for the synthesis of $(CH_3)_2Si(IndH)_2$. An orange oil was obtained and used without further purification.

16. rac-$CH_3(CH_2=CH)Si(Ind)_2Zr(NMe_2)_2$.

$CH_3(CH_2=CH)Si(Ind*H)_2$ (8.4 grams) was combined with $Zr(NMe_2)_4$ (7.2 grams) in hexane (300 mls) and attached to an oil bubbler. The solution was stirred at reflux overnight. A dark red solution resulted. The solvent was removed under vacuum. A minimum of pentane was added and the solution was stored for several days at −30° C. 8.5 grams of ruby red crystals formed of one isomer. $^1H$ NMR $(C_6D_6)$; δ 0.89 (s), 2.46 (s), 2.48 (s), 6.2–6.36 (m), 6.67–7.0 (m), 7.47–7.60 (m), 7.76–7.79 (m).

17. rac-$CH_3(CH_2=CH)Si(Ind)_2ZrCl_2$.

$CH_3(CH_2=CH)Si(Ind)_2Zr(NMe_2)_2$. (5 grams) was combined with TMSCl (>10 equivalents) in toluene (200 mls). The solution was stirred overnight. The resulting solution was concentrated and pentane was added resulting in the isolation of a yellow precipitate. (3.8 grams) $^1H$ NMR $(C_6D_6)$; δ 0.62 (s), 5.76 (d), 5.90 (d), 5.91–6.14 (m), 6.37–6.51 (m), 6.77–6.90 (m), 7.12–7.23 (m), 7.36–7.45 (m).

18. rac-$CH_3((C_6F_5)_2BCH_2CH_2)Si(Ind)_2ZrCl_2$.

$CH_3(CH_2=CH)Si(Ind)_2ZrCl_2$ (1.85 grams) was combined with $[HB(C_6F_5)_2]_2$ (1.43 grams) in dichloromethane (30 mls) at −30° C. The solution was warmed to room temperature. The resulting solution was concentrated and pentane was added resulting in the isolation of a yellow precipitate (2.7 grams). $^1H$ NMR $(C_6D_6)$; 6 0.72 (s), 1.37–1.44 (m), 2.08–2.14 (m), 5.80 (d), 5.90 (d), 6.77–6.94 (m), 7.08–7.39 (m).

19. rac-$CH_3((C_5H_5N)(C_6F_5)_2BCH_2CH_2)Si(Ind)_2ZrCl_2$.

$CH_3((C_6F_5)_2BCH_2CH_2)Si(Ind)_2ZrCl_2$ (1.5 grams) was dissolved in a one to one mixture of toluene and pyridine (10 mls). The solvent was removed under vacuum and the resulting solid was dissolved in dichloromethane. Pentane was added to precipitate the product which was filtered and dried under vacuum (1.72 grams). $^1H$ NMR $(C_6D_6)$; δ 0.86 (s), 1.12–1.20 (m), 1.5–1.74 (m), 5.84–5.87 (m), 6.31 (t), 6.63 (t), 6.78–6.92 (m), 7.05–7.14 (m), 7.34 (t), 8.02 (d).

20. rac-$CH_3((C_5H_5N)(C_6F_5)_2BCH_2CH_2)Si(Ind)_2Zr(CH_3)_2$.

$CH_3((C_5H_5N)(C_6F_5)_2BCH_2CH_2)Si(Ind)_2ZrCl_2$ (1.0 grams) was dissolved in diethyl ether and cooled to −30° C. Two equivalents of methyl lithium (1.6 mls of 1.4 M soln.) was added dropwise to the solution. A slurry formed which was stirred for several hours. The product was extracted from the LiCl with dichloromethane. The dichloromethane solution was concentrated and hexane was added resulting in a small amount of precipitate which was filtered off. The resulting solution was concentrated to a until a thick yellow slurry formed. The slurry was filtered and 0.6 grams of product was obtained. $^1H$ NMR $(C_6D_6)$; δ−0.988 (s), −965 (s), 0.823 (s), 0.92–1.1 (m), 1.5–1.8 (m), 5.70 (6), 5.80 (6), 6.26 (t), 6.5–7.5 (m), 8.04 (d).

21. $[(C_6F_5)_3B—NC_8H_6]Cp*Zr(CH_3)_2$.

$(NC_8H_6)Cp*Zr(Me)_2$ (20 mg) was dissolved into 20 ml of toluene. $B(C_6F_5)_3$ (27.4 mg) was slowly added to a stirred solution of $(NC_8H_6)Cp*Zr(Me)_2$. The solvent was removed forming a yellow sticky solid. Addition of pentane resulted in the isolation of a yellow powder. The $^1H$ NMR of the resulting complex revealed sharp single resonances for the Zr-methyl substituents at −1.18 and −1.55 ppm.

22. 4-tetrahydropyran-3-indene ("THPI").

30.0 grams of 4-chlorotetrahydropyran was added dropwise to a THF solution of lithium indenyl (30.3 grams) cooled to −30° C. The solution was allowed to warm to room temperature and left overnight. The solvent was removed, and pentane (200 ml) and water (200 ml) were added to the resulting oil. The organic portion was separated and 100 ml portions were twice added to the water phase and separated. Pentane fractions were combined and concentrated. Sodium sulfate was added to dry the pentane solution. The resulting slurry was filtered and concentrated to a yellow oil. Upon distillation under dynamic vacuum (120° C.) 22 grams of product (44% yield) were obtained. 1H NMR $(C_6D_6)$. δ 1.7–1.6 (m), 2.5 (m), 3.0 (s), 3.4–3.3 (m), 4.0–3.9 (m), 5.9 (s), 7.3–7.1 (m).

23. (THPInd)Zr(NMe$_2$)$_3$.

9.2 grams of 4-tetrahydropyran-3-indene was combined with 12.4 grams of Zr(NMe$_2$)$_4$ in 150 mls of toluene. The solution was heated to 75° C. and stirred for two hours. Removal of solvent yields a orange oil. $^1$H NMR (C$_6$D$_6$). δ 1.5–1.75 (m), 1.9–2.1 (m), 2.75 (s), 3.0–3.1 (m), 3.3–3.55 (m), 3.9–4.2 (m), 6.15 (d), 6.25 (d), 6.9–7.0 (m), 7.4–7.6 (m).

24. (THPInd)ZrCl$_3$.

3.0 grams of (THPInd)Zr(NMe$_2$)$_3$ was dissolved in toluene (60 mls). Trimethylsilylchloride (excess) was added to the solution and allowed to stir overnight. The solvent was removed and pentane was added to slurry the resulting yellow powder. The product was filtered washed with pentane and dried. (2.9 grams). $^1$H NMR (C$_6$D$_6$). δ 1.2–1.4 (m), 1.9–2.0 (m), 2.2–2.5 (m), 3.60–3.74 (m), 3.9–4.1 (m), 6.54 (d), 6.86 (d), 7.23 (m), 7.58 (m).

25. (THPInd)(Cp)ZrCl$_2$.

2.9 grams of (THPInd)ZrCl$_3$ was combined with grams of LiCp in toluene (80 mls). The resulting slurry was heated for twelve hours at 100° C. The slurry was filtered through celite yielding a orange solution which was concentrated to 10 mls and 70 mls of pentane was added. The yellow precipitate was filtered and dried under vacuum yielding 1.67 grams of product (53.5 % yield). 1H NMR (C$_6$D$_6$). δ 1.0–1.2 (m), 1.4–1.5 (m), 1.6–1.8 (m), 1.9–2.0 (m), 3.1–3.4 (m), 3.6–4.0 (m), 5.5 (s), 6.25 (d), 6.7 (m), 6.9 (m), 7.25 (d).

26. (THPInd)(Cp)Zr(CH$_3$)$_2$.

3.7 grams of (THPInd)(Cp)ZrCl$_2$ was dissolved in diethyl ether and cooled to −30° C. Two equivalents of methyl lithium (12.4 mls of 1.4 M soln.) was added dropwise to the solution. A slurry formed which was stirred for several hours. 20 mls of THF was added (pink soln. formed with white precipitate). The product was extracted from the LiCl with dichloromethane. The dichloromethane solution was concentrated and pentane was added resulting in a small amount of precipitate which was filtered off. The resulting solution was concentrated to a until a thick yellow slurry formed. The slurry was filtered and 2.0 grams of product were obtained. $^1$H NMR (C$_6$D$_6$). δ −0.85 (s) −0.20 (s), 1.2–1.3 (m), 1.3–1.5 (m), 1.6–1.9 (m), 3.0–3.15 (m), 3.3–3.5 (m), 3.8–4.1 (m), 5.6 (s), 5.55 (6), 5.58 (6), 6.9 (m), 7.15 (d), 7.25 (d).

27. (C$_6$F$_5$)$_3$Al—(THPInd)(Cp)Zr(CH$_3$)$_2$.

One equivalent of perfluorophenylaluminum was added to a solution of (THPInd)(Cp)Zr(CH$_3$)$_2$ in toluene. The product was precipitated with pentane and dried under vacuum. $^1$H NMR (C$_6$D$_6$). δ −0.92 (s) −0.4 (s), 1.1–1.5 (m), 1.7–1.9 (m), 2.8–2.9 (m), 3.1–3.4 (m), 3.9–4.2 (m), 5.4 (s), 5.6 (s), 6.9–7.4 (m). This compound was inoperative when used with triiso-butylaluminum at 60° C. polymerization temperature. It is likely that higher polymerization temperatures would overcome this operability, likely due to tight complexing of (C$_6$F$_5$)$_3$Al to the THPInd ligand.

Ethylene/Hexene Copolymerizations (LLDPE)

Polymerizations were conducted in a stainless steel, 1-liter Zipperclave autoclave reactor. The reactor was equipped with water jacket for heating and cooling. Injections were typically done through a septum inlet or were injected via a high pressure nitrogen injection. Before polymerizations the reactor was purged with nitrogen for several hours at 100° C. Upon injection of catalyst ethylene was fed continuously on demand keeping the reactor pressure constant while maintaining the reaction temperature at 60° C. After the allotted time the reaction was stopped by cooling and venting the pressure and exposing the contents of the reactor to air. The liquid components were evaporated and the poly(ethylene-co-hexene-1) was dried in a vacuum oven. Weight average molecular weight (Mw), number average molecular weight (Mn) and their ratio Mw/Mn were obtained by GPC gel permeation chromotagraphy. Hexene wt % incorporation was obtained from $^1$H NMR data.

1. Me$_2$Si(H$_4$-indenyl)2Zr(CH$_3$)$_2$ (10 mg) and (NC$_5$H$_5$)B(C$_6$F$_5$)$_3$) (14 mg) were combined in 100 mls of toluene. The resulting solution was almost colorless (No color change was observed upon mixing the catalyst and "dormant activator"). 1 ml of the catalyst precursor solution was injected into a 1 L stainless steel reactor preheated to 60° C. containing 40 μls of triisobutylaluminum, 45 mls of hexene, 75 psi of ethylene, and 500 mls of hexane. After 2 hours the polymerization reaction was stopped.

2. Me$_2$Si(H$_4$-indenyl)$_2$Zr(CH$_3$)$_2$ (20 mg) and (NC$_5$H$_4$F)Al(C$_6$F$_5$)$_3$) (30 mg) were each combined in 10 mls of toluene. 2 mls of the catalyst and 4 mls of the activator solution were injected into a IL stainless steel reactor preheated to 60° C. containing 45 mls of hexene, 75 psi of ethylene, and 500 mls of hexane. No ethylene uptake was observed. 40 μls triisobutylaluminum was added and the reaction was indicated due to the observation of ethylene uptake. After 1 hour the polymerization reaction was stopped.

3. Me$_2$Si(H$_4$-indenyl)$_2$Zr(CH$_3$)$_2$ (20 mg) and (NC$_5$F$_5$)Al(C$_6$F$_5$)$_3$) (67 mg) were combined in 10 mls of toluene. The resulting solution was bright yellow. 4 mls of the catalyst precursor solution was injected into a 1 L stainless steel reactor preheated to 60° C. containing 45 mls of hexene, 75 psi of ethylene, and 500 mls of hexane. After 0.5 hours the polymerization reaction was stopped.

4. Me$_2$Si(H$_4$-indenyl)$_2$Zr(CH$_3$)$_2$ (20 mg) and (NC$_5$F$_5$)Al(C$_6$F$_5$)$_3$) (67 mg) were combined in 10 mls of toluene. The resulting solution was bright yellow. 2 mls of the catalyst precursor solution was injected into a 1 L stainless steel reactor preheated to 60° C. containing 40 μls of triisobutylaluminum, 45 mls of hexene, 75 psi of ethylene, and 500 mls of hexane. After 0.5 hours the polymerization reaction was stopped.

5. Me$_2$Si(H$_4$-indenyl)2Zr(CH$_3$)$_2$ (20 mg) and (NC$_5$H$_5$)Al(C$_6$F$_5$)$_3$) (34 mg) were combined in 10 mls of toluene. The resulting solution is almost colorless (No color change was observed upon mixing the catalyst and "dormant activator". 1 ml of the catalyst precursor solution was injected into a 1 L stainless steel reactor preheated to 60° C. containing 40 μls of triisobutylaluminum, 45 mls of hexene, 75 psi of ethylene, and 500 mls of hexane. No polymerization was observed.

6. (4-tetrahydro-pyran-1-indenyl)(cyclopentadienyl)Zr(CH$_3$)$_2$ (20 mg) and (NC$_5$H$_5$)B(C$_6$F$_5$)$_3$) (31 mg) were each combined in 10 mls of toluene. 2 mls of the catalyst and 4 mls of the activator solution were injected into a 1 L stainless steel reactor preheated to 60° C. containing 45 mls of hexene, 400 μls of a 3.86%Al trihexylaluminum heptane solution, 75 psi of ethylene, and 500 mls of hexane. After 30 minutes the polymerization reaction was stopped.

7. (4-tetrahydro-pyran-1-indenyl)(cyclopentadienyl)Zr(CH$_3$)$_2$ (20 mg) and B(C$_6$F$_5$)$_3$) (27 mg) were each combined in 10 mls of toluene. 2 mls of the catalyst and 4 mls of the activator solution were injected into a 1 L stainless steel reactor preheated to 60° C. containing 45 mls of hexene, 400 μls of a 3.86%Al trihexylaluminum heptane solution, 75 psi of ethylene, and 500 mls of hexane. After 30 minutes the polymerization reaction was stopped.

8. Me$_2$Si(H$_4$-indenyl)$_2$ZrCl$_2$ (20 mg) and (NC$_5$H$_5$)B(C$_6$F$_5$)$_3$) (26 mg) were combined in 10 mls of toluene. The resulting solution is almost colorless (No color change was observed upon mixing the catalyst and "dormant activator".

4 mls of the catalyst precursor solution was injected into a 1L stainless steel reactor preheated to 60° C. containing 200 μls of trihexylaluminum, 45 mls of hexene, 75 psi of ethylene, and 500 mls of hexane. After 2 hours the polymerization reaction was stopped and three grams of polymer was isolated. This example illustrates polymerization activity achieved by a dihalide containing transition metal catalyst precursor compound.

Ethylene Polymerizations (HDPE)

14. $CP_2ZrMe_2$ (4 mg) and $(NC_5H_5)B(C_6F_5)_3$ (9.4 mg) were combined in 2 ml of toluene. The formed catalyst precursor was injected into a IL stainless steel reactor containing 75 psi of ethylene and 500 ml of hexane. After 10 minutes no polymerization was observed. 150 μl of 25% by weight solution of isobutylaluminum was injected into the reaction and ethylene uptake slowly increased. After 15 minutes the

TABLE 1

| Example | Activator | Catalyst | Alkyl-Aluminum | wt % Hexene[a] | Mw | Mn | $M_w/M_n$ | kg PE/g Catalyst · hr |
|---|---|---|---|---|---|---|---|---|
| 1 | PyrBAr$_{f15}$ | zirconocene A[b] | triisobutyl-aluminum | 14.9 | 124000 | 45200 | 2.74 | 225 |
| 2 | 3FpyrAlAr$_{f15}$ | " | triisobutyl-aluminum | 12.2 | 324000 | 142000 | 2.28 | 6.2 |
| 3(C) | f$_5$pyrAlAr$_{f15}$ | " | None | 30.2 | 34400 | 17500 | 1.97 | 12.4 |
| 4(C) | f$_5$pyrAlAr$_{f15}$ | " | triisobutyl-aluminum | 12.8 | 281000 | 134000 | 2.10 | 14.4 |
| 5(C) | pyrAlAr$_{f15}$ | " | triisobutyl-aluminum | — | — | — | — | 0 |
| 6 | PyrBAr$_{f15}$ | zirconocene B[c] | tri-n-hexyl-aluminum | 5.9 | 152000 | 70800 | 2.15 | 17.4 |
| 7(C) | BAr$_{f15}$ | " | tri-n-hexyl-aluminum | 5.8 | 156000 | 68200 | 2.29 | 11 |

[a]Obtained from $^1$H NMR data.
[b]Me$_2$Si($\eta^5$-4,5,6,7-tetrahydro-1-indenyl)$_2$ZrMe$_2$.
[c](4-tetrahydro-pyran-1-indenyl) (cyclopentadienyl) ZrMe$_2$.
The designation (C) identifies comparative examples.

9. Pyridine-B(C$_6$F$_5$)$_2$CH$_2$CH$_2$Si(Me)Cp*$_2$Zr(CH$_3$)$_2$ (1) (20 mg) was dissolved in 10 mls of toluene. The catalyst precursor was injected into a 1 L stainless steel reactor containing 45 ml of hexene, 38 μls of tri-n-hexylaluminum, and 75 psi of ethylene. After 51 minutes the polymerization reaction was stopped.

10. This example was conducted in the same manner as 9 except that the run time was 60 minutes.

11. Pyridine-B(C$_6$F$_5$)$_2$CH$_2$CH$_2$Si(Me)Ind$_2$Zr(CH$_3$)$_2$ (2) (10 mg) was dissolved in 10 mls of toluene. The catalyst precursor was injected into a 1 L stainless steel reactor containing 45 ml of hexene, 150 μls of 25 wt % solution of triisobutylaluminum in toluene, and 75 psi of ethylene. After 30 minutes the polymerization reaction was stopped.

12. Same as 11.

13. (NC$_8$H$_6$)Cp*Zr(Me)$_2$ (4 mg) and B(C$_6$F$_5$)$_3$ (5.4 mg) were combined in 10 mls of toluene. The formed catalyst precursor (2 ml of solution) was injected into a 1 L stainless steel reactor containing 45 ml of hexene and 75 psi of ethylene. After 10 minutes no polymerization was observed. 300 μls of 25% by weight solution of isobutylaluminum was injected into the reaction and ethylene uptake slowly increased. After 30 minutes the polymerization reaction was stopped and 15.3 g of copolymer was obtained. (See FIG. 2 and Table 2.)

polymerization reaction was stopped and 28.6 grams of polymer was obtained. Polymer characterization appears in Table 3.

15. Polymerization was conducted as in Ex. 1 but with $(C_4H_8O)B(C_6F_5)_3$ instead of $(NC_5H_5)B(C_6F_5)_3$. Polymer characterization appears in Table 3.

16. $CP_2ZrMe_2$ (2 mg) and $(Et_2O)B(C_6F_5)3$ (11.2 mg) were combined in 1 ml of toluene. A slight yellow color forms over the course of several minutes upon mixing, indicative of ether dissociation from B(C$_6$F$_5$)$_3$. The formed catalyst precursor was injected into a 1 L stainless steel reactor containing 75 psi of ethylene and 500 ml of hexane. After 10 minutes no polymerization was observed. 150 μl of 25% by weight solution of isobutylaluminum was injected into the reaction and ethylene uptake slowly increased. After 40 minutes the polymerization reaction was stopped and 1.3 grams of polymer was obtained. Polymer characterization appears in Table 3.

17. For comparison, polymerization was conducted as in Ex. 1 but with B(C$_6$F$_5$)$_3$ instead of $(NC_5H_5)B(C_6F_5)_3$. Polymer characterization appears in Table 3.

TABLE 2

| Example | Catalyst[c] | Initiator/mol.-equiv. | wt % Hexene[a] | Mw | Mn | Mw/Mn | kg PE/g Catalyst · hr |
|---|---|---|---|---|---|---|---|
| 9 | 1 | trihexyl-aluminum/20 | 0.7 | 389000 | 198000 | 1.97 | 4.8 |
| 10 | 1 | trihexyl-aluminum/20 | 1.7 | 388000 | 204000 | 1.90 | 4.3 |
| 11 | 2 | triisobutyl-aluminum/20. | 15.5 | 140000 | 35900 | 3.91 | 42 |
| 12 | 2 | triisobutyl-aluminum/20 | 10.1 | 204000 | 108000 | 1.89 | 21 |
| 13 | 3 | triisobutyl-aluminum/20 | <5%[b] | 143000 | 40200 | 3.56 | 0.56 |

[a]Obtained from $^1$H NMR data.
[b]Obtained using FTIR
[c]Polymerizations with (1) CH$_3$((C$_5$H$_5$N)(C$_6$F$_5$)$_2$BCH$_2$CH$_2$)Si—(Cp*)$_2$Zr(CH$_3$)$_2$, (2) CH$_3$((C$_5$H$_5$N)(C$_6$F$_5$)$_2$BCH$_2$CH$_2$)Si (Ind)$_2$Zr(CH$_3$)$_2$ (FIG. 3) and (3) (C$_6$F$_5$)$_3$B—NC$_8$H$_6$]Cp*Zr(CH$_3$) (FIG. 2).

TABLE 3

| Example | Activator | Alkyl alum. | Mw | Mn | MWD | kg PE/g Catalyst · hr |
|---|---|---|---|---|---|---|
| 14 | PyrBAr$_{f15}$ | (i-Bu)$_3$Al | 275000 | 127000 | 2.16 | 25 |
| 15 | THFBAr$_{f15}$ | (i-Bu)$_3$Al | 309000 | 212000 | 2.24 | 3.4 |
| 16 | Et$_2$OBAr$_{f15}$ | (i-Bu)$_3$Al | 257000 | 117000 | 2.19 | 0.65 |
| 17 | BAr$_{f15}$ | (i-Bu)$_3$Al | 277000 | 133000 | 2.08 | 29 |

The following is claimed:

1. A process for the preparation of polyolefins from one or more olefinic monomers comprising combining said olefins with i) at least one transition metal organometallic catalyst compound, ii) a Lewis acid-base complex comprising a Lewis acid group and a Lewis base group wherein the Lewis acid group is a Group 13 compound having at least one halogenated aryl ligand and the Lewis base group is an amine or ether compound, said combining being conducted in the presence of at least one tri-n-alkyl aluminum compound, wherein the Lewis base group inhibits the reaction of the Lewis acid group having at least one halogenated aryl ligand with the transition metal organometallic catalyst compound until compound with the tri-n-alkyl aluminum compound.

2. The process of claim 1 wherein said organometallic catalyst compound is a Group 4-10 transition metal compound capable of activation for olefin polymerization by ligand abstraction.

3. The process of claim 2 wherein said transition metal organometallic catalyst compound is a Group 4 metallocene compound having the formula:

$$L^A L^B L^C_i MAB$$

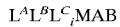

where, $L^A$ is a substituted cyclopentadienyl or heterocyclopentadienyl ancillary ligand π-bonded to M; $L^B$ is a member of the class of ancillary ligands defined for $L^A$, or is J, a heteroatom ancillary ligand σ-bonded to M; the $L^A$ and $L^B$ ligands may be covalently bridged together through a Group 14 element linking group; $L^C_i$ is an optional neutral, non-oxidizing ligand having a dative bond to M wherein i equals 0 to 3; M is a Group 4 transition metal; and, A and B are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization.

4. The process according to any of claims 1–3 wherein said combining is done under gas phase, slurry, solution or supercritical high pressure coordination polymerization conditions.

5. A process for preparing polyolefins from one or more olefinic monomers utilizing a catalyst system comprising combining said olefinic monomer(s) with a i) transition metal organometallic catalyst compound and ii) a Lewis acid-base complex comprising a Lewis acid group and a Lewis base group wherein the Lewis acid group is a Group 13 compound having at least one halogenated aryl ligand, said combining being conducted in the presence of at least one tri-n-alkyl aluminum compound, wherein the Lewis base group inhibits the reaction of the Lewis acid group having at least one halogenated aryl ligand with the transition metal organometallic catalyst compound until compound with the tri-n-alkyl aluminum compound.

6. The process of claim 5 where the Lewis base is a structural member of the transition metal organometallic catalyst compound.

7. The process of claim 5 where the Lewis acid is a structural member of the transition metal organometallic catalyst compound.

* * * * *